United States Patent

Andreas

[15] 3,705,772
[45] Dec. 12, 1972

[54] PROFILE DETERMINING METHOD AND SYSTEM

[72] Inventor: Henry E. Andreas, Wilmington, Del.

[73] Assignee: Sci-Tek Computer Center, Inc.

[22] Filed: April 20, 1971

[21] Appl. No.: 135,556

[52] U.S. Cl. .....................356/5, 343/5 R, 340/1 R
[51] Int. Cl. ...............................................G01c 3/08
[58] Field of Search.......356/4, 5, 158, 160; 340/1 R; 343/5 CM, 5 PC, 5 SC, 5 R

[56] References Cited

UNITED STATES PATENTS

| | | | |
|---|---|---|---|
| 3,007,155 | 10/1961 | Petrides et al. | 343/5 PC |
| 2,801,403 | 7/1957 | Kietz | 340/1 R |
| 3,363,225 | 1/1968 | Currie et al. | 343/5 R |
| 3,523,730 | 8/1970 | Hayek et al. | 356/4 |

*Primary Examiner*—Benjamin A. Borchelt
*Assistant Examiner*—S. C. Buczinski
*Attorney*—Mortenson & Weigel

[57] ABSTRACT

A distance ranging system of conventional design is utilized to measure radial distances transversely to the direction of motion of a vehicle or other object along a right-of-way. Using a high speed rotating transducer element, successive radial scansions are made during the vehicle movement. Each successive radial scansion or sweep is divided into segments or channels, one for every preselected number of degrees of arc in the swept field under examination. At least one channel covers every portion of the swept field. The range information for corresponding arcuate portions or channels of each succeeding revolution or sweep is compared with that previously stored information for such channel and the minimum range information retained for each of the channels. Thus, with each sweep or revolution of the ranging device, new data for each channel is individually compared with the data already residing in each channel. If the new distance measured is less than the distance previously measured and stored for this channel, this new measurement information is then stored and the old information discarded. Simultaneously therewith, lineal distance information as to the location of each minimum range point can be recorded in separate storage area. The process continues for each right-of-way to be measured at which time the operator transfers the stored information to be transferred to paper tape or other storage.

16 Claims, 6 Drawing Figures

PATENTED DEC 12 1972

INVENTOR
Henry E. Andreas
BY
Mortenson and Weigel
ATTORNEYS

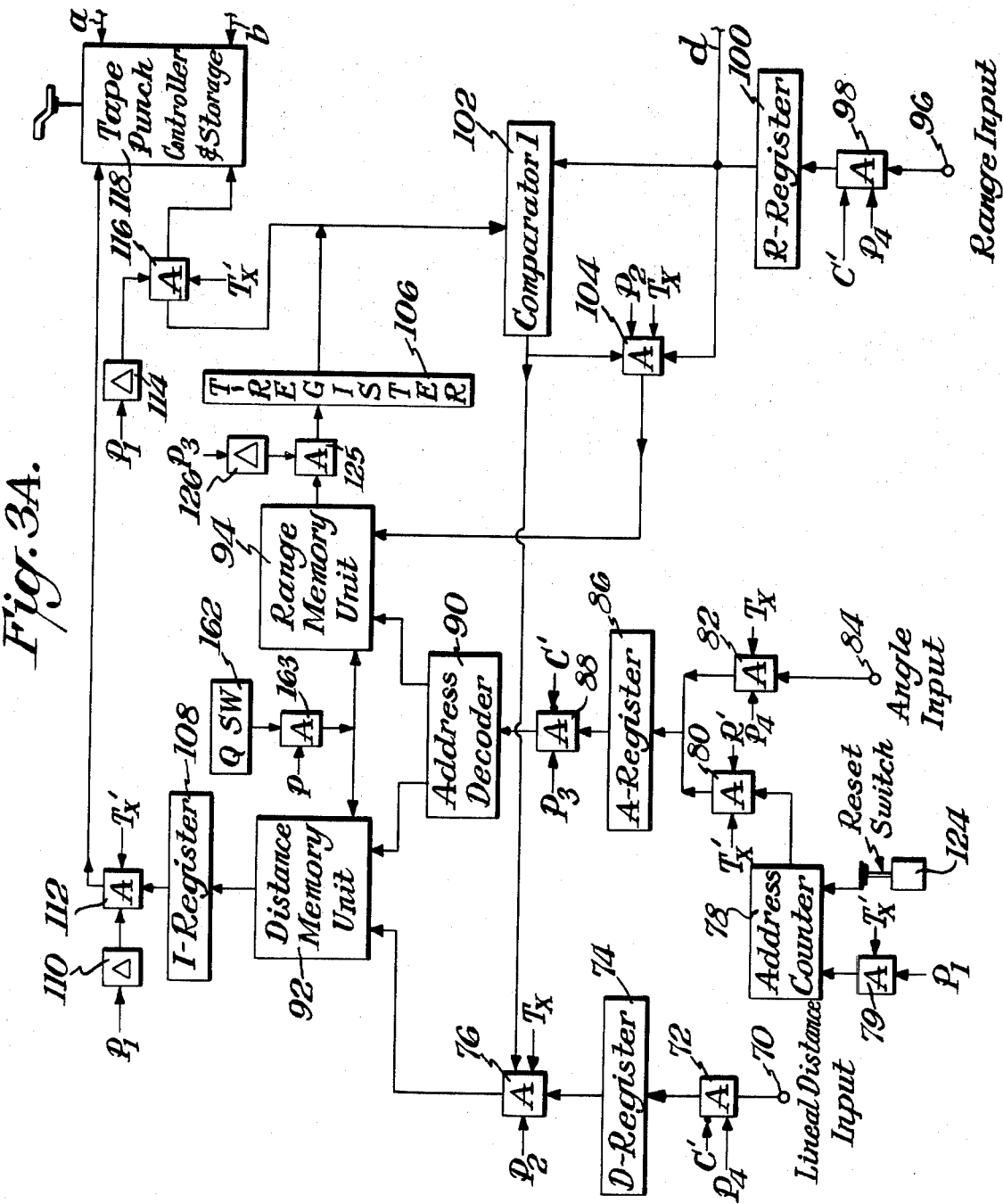

INVENTOR
Henry E. Andreas
BY
Mortenson and Weigel
ATTORNEYS

PROFILE DETERMINING METHOD AND SYSTEM

BACKGROUND OF THE INVENTION

This invention relates to methods and systems for determining the clearance profile along preselected courses.

In transportation and related fields it is particularly desireable to have accurate and up-to-date information as to the clearance profile of the particular right-of-way, roadbed, water course, etc. For example, in the normal operation of railroads it is often necessary to transport an oversized load from one location to another. When this problem arises, the present methods of solution include sending a crew out on a motorized hand car to physically measure and record the actual heighth and width of the right-of-way at various constricted locations.

In the case of tunnels through mountains, it is often desireable to periodically survey the profile of the tunnel. In this manner any displacements, sags, etc., of the tunnel walls caused by rock pressure, ice, thawing, etc., can be readily ascertained and corrected if necessary. Here again, the mechanical methods utilized to ascertain the profile of the tunnel are extremely time consuming.

There has been a U.S. Pat. No. 2,801,403 issued July 30, 1957, to Hans Kietz. In this patent, the inventor, Kietz, discloses a technique utilizing ultrasonic wave energy and measuring the time in which the energy takes when used as an echo sounder to go out to the tunnel wall and travel back to the transmitting point. In this technique several ultrasonic transducers are used to transmit the ultrasonic energy in several radial directions simultaneously. The distance measurements obtained from each of these several transducers is simultaneously recorded on a chart for later utilization and study.

A similar ultrasonic energy technique is utilized with ships to obtain continuous profiles of the ocean floor as the ship progresses along the surface of the water. A related technique is utilized to inspect well bore diameters. In this application, the ultrasonic energy is transmitted and the time of sound transmission to the bore wall and return is measured as being indicative of the distance from the transducer to the wall. As the transducer is lowered in the well bore it is rotated at a predetermined speed. In this manner the transducer continuously scans the surface from which the waves are reflected. The reflected signals are reproduced on an oscilloscope having a circular sweep such that the oscilloscope provides a visual indication of the diameter profile of the well bore as the transducer is lowered therethrough. While quite useful, all of these prior art systems suffer from a disadvantage in that they require the recordation of volumes of information which appreciably increases the cost of the entire system. Further, someone must visually study and laboriously analyze much of the information so obtained.

Accordingly, it is an object of this invention to provide a simple, economical method for obtaining either partial or full clearance profiles along preselected courses.

Another object of this invention is to provide a simple, economical system for determining the minimum clearance profile of an existing right-of-way.

Another object of this invention is to provide an improved method of obtaining clearance profile information along a preselected right-of-way which method requires a reduced amount of data storage volume.

A further object of this invention is to provide an improved system which requires a minimal amount of information storage space for determining the minimum clearance profile of a particular right of way.

BRIEF DESCRIPTION OF THE INVENTION

This invention provides both a method and system for determining the minimal transverse clearance distances available to a vehicle, ship or other movable object when moving along a preselected course or right-of-way. According to the preferred method of the invention a signal, whether it be optical, sonic, electromagnetic or otherwise, is caused to be transmitted from a transducer or transmitter mounted on the movable object out to the walls, objects or surfaces surrounding the preselected course. The reflections of that signal are detected at the point of transmission and by observing such criteria as time of transmission and return, phase change resulting during the transmission, and the like, indications of the distance to the reflecting objects or surfaces are obtained. This signal is caused to sweep or scan in a radial manner transversely to the direction of motion of the movable object.

The distance or ranging information derived from each scansion or sweep is divided into segments or channels, one for every few degrees or so of arc comprising the swept field, with at least one channel for every element or portion of the radial profile. The range information for each channel is stored. Thereafter with each new scansion the new data for each channel is individually compared with the data already stored in such channel. If the newly determined range information is less than the stored range information in that particular channel, the new range information is returned to storage and the old information discarded. This process continues until the end of the course under study at which time the stored information is transferred to punched paper tape or other storage medium. The data channels are reset to zero and the process may be repeated for another course or right-of-way study. Lineal distance information along the course to the minimal clearance point in each channel may be simultaneously recorded. In addition, there may be recorded the number of times that range information falls into varying preselected ranges. Once placed on the paper tape, the information may be returned to a computer center for further analysis and study and utilization in program studies.

The preferred system of this invention utilizes an optical transmitter-receiver unit in which the optical signal is modulated and directed along the course to be traversed. A 45° offset flat mirror is rotated arcuately and causes the light beam to sweep a radial course transversely to the direction of motion to the transporting vehicle. The phase of the received signal is compared to that of the transmitted signal and the difference of phase is a measure of the distance to the reflecting surface. This difference measurement is converted to digital form using conventional techniques and stored in an input register. For each of the several radial channels on the initial scansion this information is transferred directly to storage. Thereafter the information remains in a storage register and the stored information for the corresponding channel is withdrawn and compared with the new information. Depending upon whether the new information indicates a lesser range or not, the information which is stored in the input register is then transferred to storage to replace the originally stored information. Upon the completion of a particular right-of-way study, stored information is transferred to a second storage unit from whence it is transferred through a buffer to a tape punch outlet.

The system also includes a distance input which indicates the distance along the right-of-way that the transporting vehicle has traversed at the time a transfer of new range information to storage takes place. Upon each transfer to storage the new distance signal is transferred to a corresponding storage channel in the distance storage. Upon completion of the run this information likewise may be transferred to the punched tape. Finally several counters can be utilized to count the number of times the range information falls within a predetermined range. This information would also be transferred to the paper tape at the end of the run. Other information can be placed on paper tape by a human operator utilizing a keyboard console either before or after a completed run.

BRIEF DESCRIPTION OF THE DRAWINGS

The novel features that are considered characteristic of this invention are set forth with particularity in the appended claims. The invention, itself, however, both as to its organization and method of operation, as well as additional objects and advantages thereof, will be best understood from the following description when read in connection with the accompanying drawings, in which:

FIGS. 3A and 3B constitute block diagrams of the computing system interconnecting at $a-a'$, $b-b'$, and $d-d'$ and constructed in accordance with this invention capable of processing the data derived utilizing the system of FIG. 1;

DESCRIPTION OF THE PREFERRED EMBODIMENTS

Figure 1:
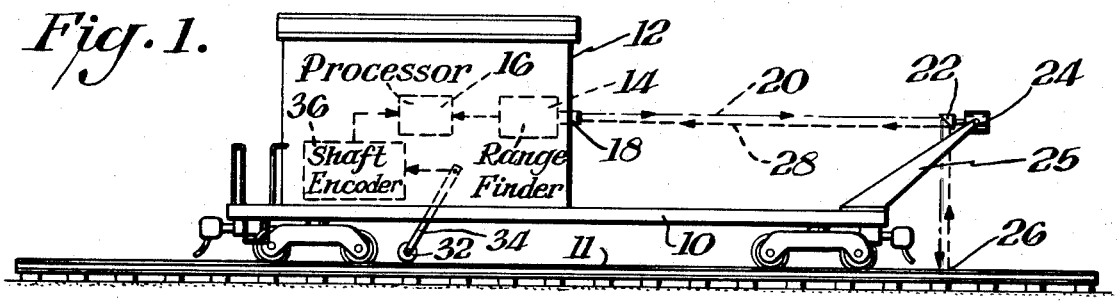
FIG. 1 is a side elevation view of a vehicle mounting the range finder and processor of this invention for use in surveying a railroad right-of-way.

There is seen in FIG. 1 by way of illustration a system for determining the clearance profile of a railroad right-of-way. The system includes a railroad car 10 adapted to ride on tracks 11. This car includes a housing 12 which together with other attachments has all of the apparatus necessary to study the minimum clearance right-of-way profiles along sections of track as desired. To accomplish this function the housing 12 includes an optical range finder 14 which provides digital output information representative of the measurements accomplished. This digital information is coupled to a processor illustrated by the dashed lines 16. The function of this processor is to reduce the amount of data obtained so as to simplify the later analysis.

In any event, the light signal from the range finder passes out through a lens system denoted at 18 along the dashed line 20 to a 45° mirror 22 adapted to be rotated about an axis parallel to the track at a high speed as by motor 24 which is mounted as by arm 25 to be in the front or rear of the car or in any event, clear of the car body itself to permit a clear view of the track and right-of-way. The thus reflected light beam moves tranversely to the direction of car motion or to the direction of the right-of-way so as to radially scan at all times in a continuous fashion the clearance profile available to the car as it traverses the tracks 11. Thus, the light beam 20 is reflected as at 26, returned via the mirror 22 back through the lens system 18 to suitable photodetector or photomultiplier not shown.

The particular optical system used for optical ranging is immaterial. Any suitable system will suffice. One such distance measuring system using ordinary light is that described by Irving Wolff in his U.S. Pat. No. 2,234,329 issued Mar. 11, 1941. The Wolff patent describes a fundamental system in which the outgoing light is modulated at a high frequency. The reflected modulated light beam has its phase compared to the phase of the transmitted light signal. This change in phase is a measure of the distance traversed by the reflected light beam. A more sophisticated system for this purpose is described by K. A. Ruddock in his U.S. Pat. No. 3,446,971 issued May 27, 1969.

To obtain an indication of the lineal distance or position along the track 11 of the car 10, a distance measuring wheel 32 is mounted as by arm 34 to follow the track 11. Suitable gearing may be used, for example, as described in the said Bremen patent, to couple the rotations of the wheel 32 to a shaft encoder 36 which provides a digital indication of the lineal distance along the track. This shaft encoder 36 is coupled to the processor 16 so that the distance information as to the location of the several minimal clearance points and other related information may be readily obtained.

Figure 2:
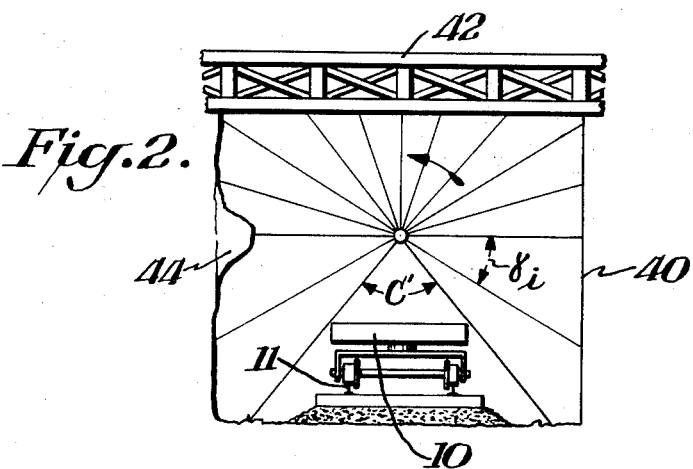
FIG. 2 is an end view of the transporting vehicle illustrated in FIG. 1 depicting the manner in which the information channels may be segmented along the clearance profile.

The illustration of FIG. 2 shows the same car 10 on the tracks 11 but is symbolic in illustrating the manner in which the radial scansion is divided up into arcuate segments $\gamma i$. Thus as the mirror 22 (FIG. 1) is rotated, the light beam may be seen to scan, in this case, in a counterclockwise manner. If now a distance measurement is made periodically, during the scansion, depending upon the rate of rotation of the mirror and the period of the measurements the arcuate segment $\gamma i$ will be lesser or greater. In any event, the radial distance or range measured during the traversal of each arcuate segment is considered for analysis purposes a channel and the information derived on each channel on each successive revolution is compared and only the minimum clearance distance is ultimately recorded as will be described hereinafter. It will be seen that there is a portion of the scansion designated $C'$ which is of little value inasmuch as this represents the width of the transporting vehicle or railroad car itself. Accordingly, this represents useless information and in effect, a period of time during which computer processing of the information may take place without loss of resolution. As the car 10 in FIG. 2 traverses along the rail, it may pass under an overpass 42 having side walls 40. There may be an obstruction 44 of some type as indicated. All of this information as to the height of the overpass, the distance to the obstruction, etc., is critical, particularly if some large load is to be moved along the right-of-way.

For the purpose of determining the minimum clearance profile along a right-of-way, a system is described for collecting and preprocessing data, collected during a series of discrete time intervals ($T_1, T_2 \ldots T_m$). Each $T_j$ is composed of a series of discrete time intervals ($_1, _2 \ldots _n, C'$) such that $$T_j = \left(\sum_{i=1}^{h} \gamma_i\right)_j + C'_j \quad (1)$$

$C'$ is a constant. Consider that series of time periods ($T_1, T_2 \ldots T_m$) such that the total time over which data is collected is $T$, and $$T = \sum_{j=1}^{m} T_j$$

or $$T = \sum_{j=1}^{m}\left(\sum_{i=1}^{m} \gamma_i\right)_j + \sum_{j=1}^{m} C'_j \quad (2)$$

Now assume that each specific $\gamma k$ is of equal length for all values of $j$. That is $(\gamma i\ )_j = (\gamma i\ )_k$ for all values of $k$ and $j$, for each $\gamma j$ and that $C'_j$ is a constant for all $j$.

This last assumption implies that $T_1 = T_2 = \ldots T_m = T$
That is, all the time periods are equal.

$$T = \sum_{j=1}^{m} [_{i=1}(\gamma'_i)_j] + mC'$$

or $$T = mT \quad 3$$

Now assume that data is collected during each time interval ($\gamma i\ )_j$. This data can be represented by a number in any numerical system. Denote the value of this data as $\sigma i_j$. The problem is to store only the useful data. For the contemplated system, for determining minimum clearance profiles, there are three types of data which would be useful:

a. Minimum value of $\sigma_{ij} (i = 0, 2 \ldots n)$, for each of the values of $j$ ($j = 1, 2 \ldots m$).

b. The above (a) plus a second set of data $\beta_{ij}$ (for each value of $j$) indication the value of $j$ or an equivalent piece of data from the shaft encoder 36 for which the corresponding $\sigma_{ij}$ took on its minimum value (for $i = 1, 2 \ldots n$).

c. Any combination of (a) or (b) plus a set of data $\sigma_{ij}$ indicating the number of times $\epsilon_{ij}$ was within a given range for a particular $j$, within the time period $T$ (for a particular $i$).

d. Data covering multiple ranges, or specific ranges for each of a multiple value of $j$ as described in (c)

are covered as well as any combinations of (a), (b), (c) or (d).

Figure 4:
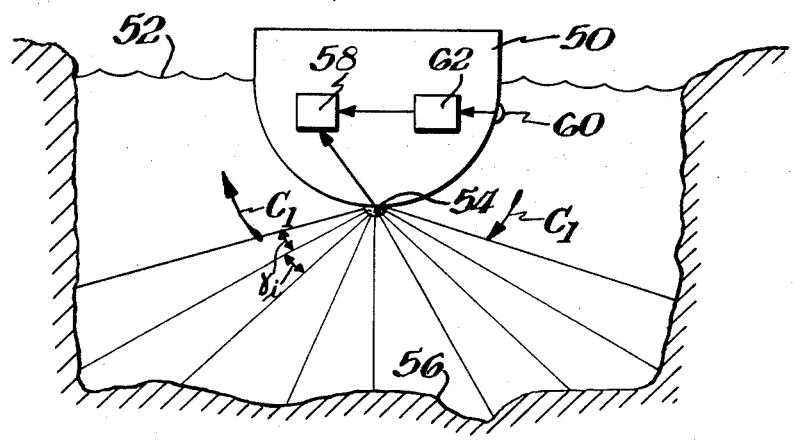
FIG. 4 is an end elevation view taken partially in cross-section of a ship traversing a particular water course illustrating the manner in which the bottom profile on the ship's course may be measured and recorded utilizing the system illustrated in FIGS. 3A and 3B.
Figure 5:
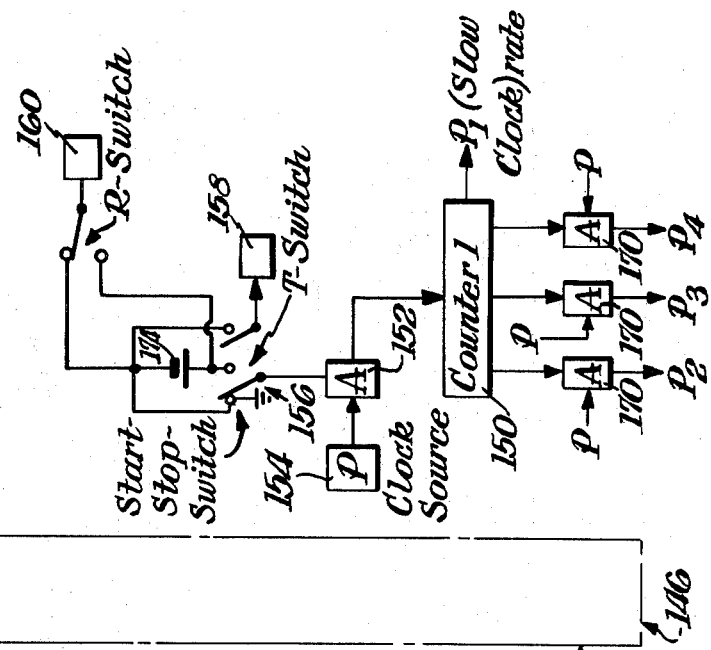
FIG. 5 is a block diagram of some of the system which generates the timing pulses and control levels for the system illustrated in FIGS. 3A and 3B.

An alternative usage for the method and system of this invention is illustrated in FIG. 4 in which a ship or other seagoing vessel 50 is seen to be floating in the water 52. In this case an ultrasonic transducer 54 is caused to rotate transversely to the direction of motion of the ship. The transducer 54 sends out ultrasonic impulses during its rotation thereby to radially scan the seabottom or canal bottom in a manner similar to the optical signals described in connection with FIG. 2. Thus, measurements may be made as to the clearance profile 56 of the bottom of a canal, river or ocean floor. This information is decoded and processed by a processor designated by the block 58. Distance information as to the ship's position may be obtained by what is symbolically represented as a transducer 60 which may be of conventional design. This distance information is encoded by a suitable encoder 62 and transferred to the processor 58. Here again the non-useful information is that derived during the time interval $C_1$ which in this instance includes a greater portion, i.e., more than half, of each cycle of rotation of the transducer 52.

Whatever the use the method of this invention involves the repetitive or continuous radial scansion of a right-of-way or course of a vehicle, ship or other movable object with a ranging apparatus while the vehicle is moving along the right-of-way. The radial ranging or distance information derived from the ranging apparatus is broken into segments or channels and stored. The information derived on each subsequent radial scansion is compared channel by channel and the several stored channel locations continuously updated with the minimal ranging information obtained in each instance so that the ultimately stored information upon the complete traversal of a particular right-of-way represents only that corresponding to the minimum clearance profile available to the vehicle along that particular right-of-way. This appreciably reduces the data storage requirements of the profile determining system and provides a relatively simple manner of retaining and determining proper routes over which particular objects can be transported. In addition, the final data supplied is in a computer readable form and can thus easily be further processed later to provide graphical or other output.

Distance information as to the position or locations of the several minimal clearance points may also be stored. Along with this, the number of times within which the several clearance ranges for the several channels fall may also be stored. This provides an indication of the number of points along the right-of-way which have obstructions falling within that particular clearance range from the vehicle for a given direction. As a further method of collecting useful information relative to the clearance profile of a right-of-way, each time a segment or channel range measurement falls within a predetermined range, that fact is counted. This permits determination of the difficulty of traversing a particular right-of-way. If, for example, a particular right-of-way has only two clearance ranges of say 5 feet in channel 120, it may be possible to traverse such right-of-way with a 5.5 foot protrusion of an object in the sector of channel 120 by physically shifting the load one half a foot at two points. If there are 10 such points in channel 120, it may be desireable to route the load over another possibly longer route.

Figure 3B:
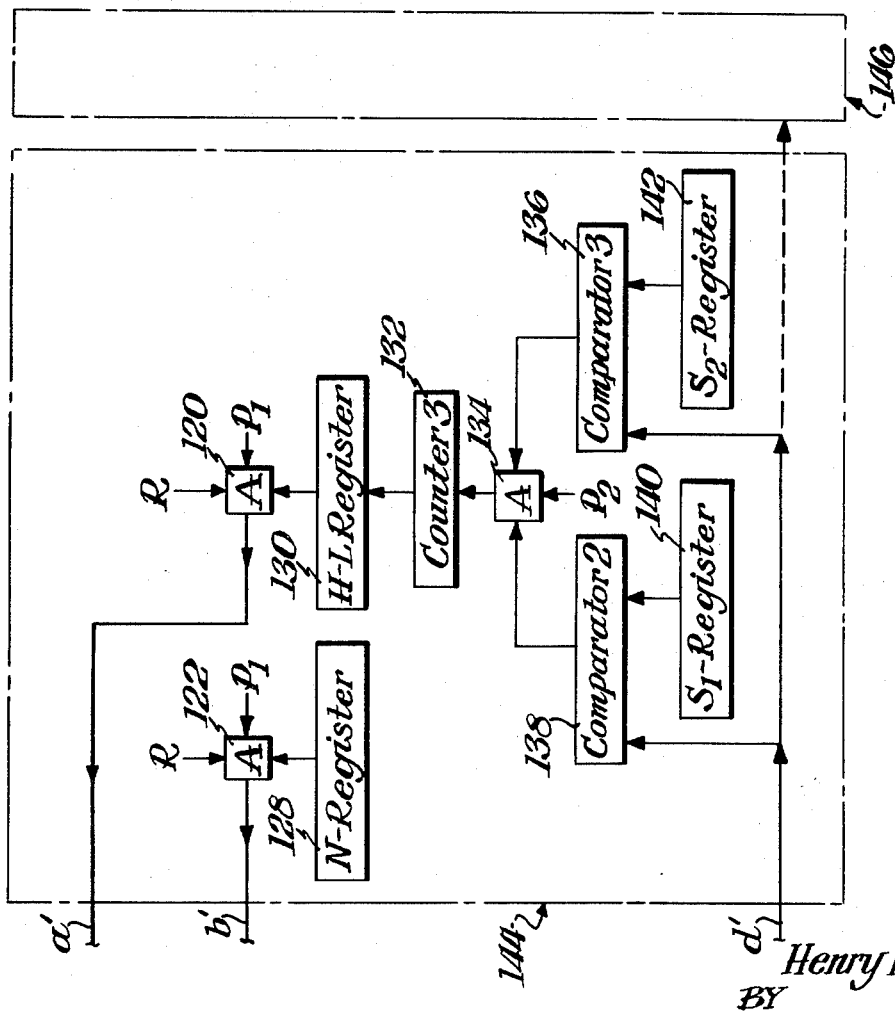

The method disclosed herein may be followed using the system illustrated in FIG. 3. In FIG. 3 the sequential range input information or physical manifestations thereof in digital form from the range finder 14 (FIG. 1), representing the clearance distances for each of the several channels, is successively fed into the range input terminal 96. In like manner, lineal distance information, or physical manifestations thereof in digital form, for each of several clearance measurements is fed into a distance input terminal 70 to signify how far along the right-of-way under study the corresponding range measurements occur. A third input to the system of FIG. 3 is derived from a shaft encoder associated with the motor 24 (FIG. 1) and is a digital signal or manifestation representing the scansion angle of the corresponding range information. This is applied to input terminal 84 of the processor 16 (FIG. 1).

Before discussion the operation of the system the operation and function of several of the components used in this system will now be described. The system illustrated in FIG. 3 is seen to include a pair of memory units specifically a distance memory unit 92 and a range memory unit 94. These memory units may be of any conventional type such as magnetic core, drum or for that matter, may be conventional flip-flops having the conventional reset R and set S inputs and corresponding 0 and 1 outputs. Each memory unit consists of a number of storage elements which are adapted to hold a number of addressable words W consisting of bits B each. The magnitude of the quantity W is determined by the maximum number of arcuate segments into which the scansion is divided in one revolution and the magnitude of B is determined by the number of binary bits needed to represent the largest value of range or lineal distance.

By way of example, if the maximum range in determining the profile is set at 30 feet and the desired resolution in range is one-quarter of an inch, then B for each word stored in the range memory unit 94 would be 11 bits since this is the number of bits necessary to represent the 1,440 elements of one-quarter inch elements which exist in 30 feet. By similar analogy, if the resolution in lineal distance at which the several sections of minimum range are determined is selected to be 10 foot intervals and the maximum distance over which the measurements are to be taken is 20 miles, then the quantity of B for each word held in the distance memory unit 92 will be 14 bits, i.e., B in bits is given by $$B = // 3.33 \log_{10}(M/r) //$$

where $M$ is the maximum distance interval to be surveyed, and $r$ is the resolution and $// x //$ means the next highest integer value of $x$. In like manner, $W$ for both of the memory units 92 and 94 is given by the formula $W = 360/r$ where $r$ is the angular resolution in degrees.

The memory units 92 and 94 are addressed by an address decoder unit 90 which may consist of nothing more than a conventional diode or other type of matrix capable of decoding whatever binary address appears in the A register 86 and functions to direct digital information or manifestations from the respective D register 74 and the R register 100 into the respective addressed storage locations in memory units 92 and 94. The address decoder 90 also provides the appropriate electrical path for stored signals from the memory unit 92 to its output I register 108 and from the memory unit 94 to its output T register 106. It is thus seen that information flow is from the input registers 74 and 100 into the memory units 92 and 94 during the time periods $P_2$ and from the memory units 92 and 94 into the output registers 106 and 108 during the time periods $p_3$.

Also associated with the memory units 92 and 94 are the Q switches 162 which permit the insertion of data into the memory unit from the control console (not shown) with neon lights being provided as output devices to present the stored result. Hence, both switches and neon lights are connected to each bit of the memory units 92 and 94. Insertions into the memory through this route are made during R time through AND gates 163.

The registers employed herein are used to temporarily hold the binary representation of a particular parameter and may be of any conventional type. For example, a register may be implemented using a plurality of flip-flops each having set S and reset R inputs and corresponding 1 and 0 outputs. The individual register size in bits is determined by the binary representations of the largest expected parameter the register must hold.

The system of FIG. 3 also includes a clock source 154 which is a pulse generator providing a repetitive string of timing or clock pulses separated by a particular time interval. The clock pulses are used to trigger the various gates and registers throughout the system and thereby synchronize the operation. These clock pulses are coupled through an AND gate 152 which is primed by a signal from a start-stop switch 168. The start-stop switch 168 is illustrated as simply a two position switch capable of being connected to either pole of what is symbolically shown as a battery 174. This allows a 1 or 0 signal level to be applied to the AND gate 152 thereby passing the clock pulses p necessary to operate the system. In practice these levels are typically provided by flip-flops. In its simplest form the start-stop switch 156, which is represented schematically only, can be connected to a positive battery voltage for the 1 state and ground for the 0 state. Using this arrangement, the system power can be "one" and the system will be in a standby state before activating the start of the operation.

The AND gates are also conventional and may be implemented using known transistor-diode or diode logic and have an output which assumes the 1 state if all the inputs are in the 1 state. If any one of these inputs are in the 0 state, the output will be a binary 0. In the instance where the AND gates are transferring a plurality of signals such as a parallel transfer between registers and the like, only one connecting line is shown for the sake of simplicity. It will be understood, however, that these AND gates do function as transfer AND gates and do control the transfer simultaneously of all of the parallel binary lines.

The clock pulses from the clock source 154, after passing through AND gate 152, are connected to a counter 150. A counter is a conventional device which counts the incoming pulses according to a specified algorithm and in addition can output the binary count such that new clock rates are achieved. The counter design can be implemented using flip-flops or with AND and OR gates. In this instance the clock pulses p are counted by the counter 150 and the several outputs of the counter pass through AND gates 170, each of which is primed by a pulse R from an R switch 160 which provides R and R' outputs corresponding to binary 1 and binary 0, respectively. The R switch may be similar to the start-stop switch 156 and is symbolically represented by the two position switch 160 connected to the battery 174.

In any event, the output of each of the successive AND gates 170 provides repetitive timing pulses $p_4$, $p_3$, $p_2$. These pulses have the sequence $p_4$, $p_3$, $p_2$ which sequence continually repeats itself. The output of the counter 150 also provides a very slow clock rate pulse $p_1$ which is used to readout the memory to a tape punch 118. These pulses control the sequential operations that must be performed to establish the minimum range during a given angular segment period. Finally, for the initial level determining condition, there is a T switch 158 which provides output signals $T_x$ corresponding to the 1 output level and $T'_x$ which corresponds to the 0 output level. The signals are derived from what is again illustrated as a two position switch, whose contacts are connected to the battery 174. The T switch 158, as will be described hereinafter, is used to inhibit the input to the tape punch 118 during measurement and to activate and allow an input to the tape punch when dumping the core storage into the tape punch at the end of a particular run. In like manner the R switch 160 is used to control the transfer of the contents of certain registers to the tape punch after the contents of the core have been transferred.

The system in FIG. 3 is seen to pass the lineal distance input information appearing on input terminal 70 through an AND gate 72 having a priming input from the timing pulse $p_4$ and an inhibit input from the C' signal (FIG. 2) derived from the shaft encoder 36 (FIG. 1). After passage through the AND gate 72, the signals are stored in a D register 74. The output from the D register 74 is passed through an AND gate 76 having three priming inputs from the second timing pulse $p_2$, $T_x$ and from the output of a comparator 102. The comparator 102 is a conventional device having two inputs from registers and any number of outputs which take on the 1 or 0 state depending upon whether the contents of one register are greater than the other. In the comparator 102 the 1 output signal is provided if the contents of the stored range information is greater than the new input range information as will be described. If the reverse is true, the output from the comparator 102 assumes the 0 state. In like manner, the remaining comparators operate such that in the case of the second comparator 138 if the range information from the R register 100 is greater than the range level information stored in the $S_1$ register 140, the output of the second comparator 138 is a binary 1. If the range information stored in the R register 100 is less than the range level information stored in the $S_2$ register 142, then the output of the third comparator 136 is 1.

Returning to the flow path for the lineal distance input information, this information is passed from the D register 74 through the AND gate 76 to the distance memory unit 92. The output from the distance memory unit 92 is in I register 108 and from there the information is transferred through the transfer AND gate 112 which is primed by the timing pulse $p_1$ slightly delayed by the delay unit 110 and by the $T'_x$ signal. The output of the transfer AND gate 112 is passed to the tape punch controller and storage unit 118 which may be of conventional design.

The scanning angle input information signals from the shaft encoder 36 (FIG. 1) are applied to the angle input terminal 84 and from there passed through the transfer AND gates 82 primed by the timing pulses $p_4$ and $T_x$ to the A register 86. From the A register, the angle input information is passed through transfer AND gates 88 primed by the third timing pulse $p_3$ and an inhibit input from the C' signal to an address decoder 90 which decodes the angle information so as to provide the addressing for both of the memory units 92 and 94.

A parallel input to the A register 86 is provided by the first timing pulse $p_1$ for the purpose of providing an automatic slow read out to the tape punch 118 from the memory units. These slow timing pulses $p_1$ are passed through an AND gate 79 when primed by $T'_x$, which signal controls transfer to the tape punch, to an address counter 78 and from there through an AND gate 80 primed by $T'_x$ and R' signals to the A register 86. A console reset switch 124 resets the address counter 78 to 0. The memory units 92 and 94 may be instructed from a console, represented by the Q switch 162 which passes information from console pushbutton switches through an AND gate 163 primed by the clock pulses $p$. The Q switches are conventional and can provide both address information as well as range or distance information to be stored.

Signals indicative of the lateral range to an obstruction are applied to the terminal 96 and passed through transfer AND gates 98 primed by the fourth timing pulse $p_4$ and an inhibit input from the C' pulse. From the transfer AND gates 98 the range information is passed to the R register 100. From the R register 100 the information is passed to an AND gate 104, a first comparator 102, a second comparator 138 and a third comparator 136. The information may also be passed to additional comparators depending upon how much additional range classification information is desired as will be described hereinafter. The AND gates 104 are primed by the first comparator 102, by the second timing pulse $p_2$ and $T_x$. The outputs of the range memory unit 94 are coupled through AND gates 125 which are primed by the third timing pulse $p_3$ after passage through a delay circuit 126. The outputs of the AND gates 125 are connected to the T register 106 which has an output connected to the first comparator 102 and also to two input transfer gates 116 which are primed by the first timing pulse $p_1$ after passage through a delay unit 114 and by $T'_x$. The outputs of the transfer gates 116 are coupled to the tape punch controller and storage unit 118.

One or more range classification interval units 144 and 146 may be employed as desired. Only the details of the first interval unit 144 are shown herein in detail. Each unit includes a pair of comparators 138 and 136, each being fed by a respective low and high S register 140 and 142, respectively, the first $S_1$ containing a low reference range level and the second $S_2$ containing a high reference range level. The comparators operate such that the second comparator 138 provides a 1 output signal in the event that the range input information from the R register 100 is greater than the value held in the low $S_1$ register 140. The third comparator 136 provides a 1 output signal if the range input information from the R register is less than the value held in the high $S_2$ register 142. The outputs of the two comparators 136 and 138 are coupled to provide two inputs of an AND gate 134, the third input being provided by the second timing pulse $p_2$ to pass an output signal upon the occurrence of the second timing pulse to a third counter 132 whose output is held in an HL register 130. The output of the HL register 130 is passed through the transfer gates 120 primed by the R signal and the first timing pulse $p_1$ to transfer the contents of the HL register 130 to tape punch controlled and storage unit 118 at the end of the sequence as will be described hereinafter. To complete the interval unit 144, an N register 128 holds an identification number indicative of the particular range of values contained in the interval unit 144. This identification number if passed through an AND gate 122 primed by the R signal and the first timng pulse $p_1$ to pass this identification number to the tape punch controller and storage unit 118.

There are three different periods of operation which can be defined as the measurement period, the memory to paper tape dump period (DP) and the interval unit 144 to paper tape transfer period (IP). The controlling signal conditions during the measurement period are $T_x$ in the "1" state and R in the "0" state with the start-stop switch 156 in the START position. Initially all of memory units 92 and 94 have been zeroed out via the Q switches 162. During the measurement period the values of range, lateral distance, and the particular angular segment under measurement appear at terminals 96, 70 and 84, respectively. The value of the angular segment in the actual segment number (1 through M) is generated by a shaft encoder 36 (on the rotating mirror motor). In this way, the segment number corresponds to a particular address in memory units 92 and 94 and also corresponds to a known angular orientation of the mirror. This also serves to avoid the usual synchronization problems at starting. For instance, if the angular resolution is 1.5° then there will be segments per scansion and upon startup if the mirror is oriented such that the first range measurement is from segment 221 then the binary representation of 221 will appear at terminal 84. Also, memory units 92 and 94 will be addressed at location 221.

The inputs at 70, 84 and 96 are transferred to registers 74, 86, and 100 through the respective AND gates under the control of cycling pulse $p_4$ in the absence of the pulse C' from the shaft encoder as for the range and distance inputs and in the presence of the $T_x$ signal as for the angle input. Upon the occurrence of timing pulse $p_3$ and in the absence of the C' pulse, the address in the A register is transferred to the address decoder 90 whereupon the contents at this address in the memory units 92 and 94 are transferred to registers 108 and 106 respectively. At this point in time, the contents of T register 106 are fed into the first comparator 102 and compared to the range value in R register 100. What is being compared is the last minimum range value for this particular segment ($\gamma i$) and the current range measurement for ($\gamma i$) which is in register 100. If the contents of the T register 106 are greater than the contents of R register 100, then a 1 state is created on the comparators output line which feed into AND gates 76 and 104. This operation takes place before the arrival of the $p_2$ timing pulse. When timing pulse $p_2$ arrives, the contents of 74 and 100 will be transferred to memory locations specified by the address, still in register 86, thereby overwriting the previous values. This is because all inputs to AND gates 76 and 104 are in the 1 state at this time.

If the contents of T register 106 are less than the contents of the R register 100 than a 0 state is presented on the output lines of comparator 102 and consequently when the timing pulse $p_2$ arrives, no transfer between registers 74 and 100 and memory units 92 and 94 will take place since one of the inputs to AND gates 76 and 104 is in the 0 state. In this fashion the minimum range value for a particular segment and its associated lineal distance is either preserved or replaced depending on the comparison results.

When timing pulse $p_4$ cycles the range value into register 100, the range value is also presented to comparators 136 and 138 in the interval unit 144. If the range value in R register 100 is between the contents of register 140 and 142, then a 1 condition is output from both comparators 138 and 136. This in turn cycles counter 132 upon the occurrence of timing pulse $p_2$. If the contents of R register 100 are less than the contents of the $S_1$ register 140 or greater than the contents of the $S_2$ register 142, a 0 condition will be output from the respective comparators and no increase in count will occur. Since the switch R is in the 0 state during the measurement period the value contained in counter register 130 will remain there until R' time. As previously explained, interval unit 144 will count the number of times a measured range value is within a specified interval say 10 to 12 feet. If it is desired to determine the counts of other intervals (e.g., 12 to 14 feet) then other interval units such as shown by 146 can be inserted.

At the end of the measurement period range memory unit 94 will contain all the minimum range values for each segment $\gamma i$ while distance memory unit 92 will contain the lineal distance at which these minimum values occurred. The memory addresses are the specific segment numbers. The interval counts are contained in register 130. The next operating period is the DP period where the value in memory must be transferred to paper tape. To do this the T switch 158 must be such that $T_x$ is in the 0 state and $T'_x$ is in the 1 state so that no further memory write transfers will occur. In addition, $T'_x$ activates the address counter 78, which is a binary counter that cycles from 1 to M under control of timing pulses $p_1$. The output from address counter 78 is passed to the A register 86 and decoder 90 and the contents of each memory location sequentially inserted into registers 108 and 106. The contents of registers 108 and 106 are then cycled to the tape punch controller 118 through gates 112 and 116 primed by $T'_x$. This operation is continued until all of the contents of memory units 94 and 92 have been transferred to tape. It must be noted that reset switch 124 must be activated (setting all zeroes in the counter) before setting the T switch so that the memory transfer begins at the first location when memory is again dumped to tape.

The last period is the IP period where the value of the interval counts contained in register 130 and the identification number of the interval unit 144 contained in 128 is transferred to paper tape. To do this the R switch is activated such that R is in the 1 state and the registers 128 and 130 are cycled by timing pulse $p_1$ through AND gates 120 and 122. This completes the total test and the start-stop switch may be set in the stop position. The minimum profile information of the right-of-way is determined and now held on tape for further processing and storage as may be desired.

The system just described is a rather simplified, direct or hard wired computer capable of performing the necessary data simplifications necessary to obtain the minimal profile information necessary for a particular right-of-way. To this extent the particular system described is exemplary only. It should be understood clearly that any other special purpose, or for that matter, any general purpose computer may be programmed to accomplish the method of this invention. The invention is not limited to the particular system shown in FIG. 3.

The punched tapes thus prepared may be stored and taken back to a central processing unit at which the information may be placed on a high speed microfilm plotter to provide profiles in film form for easy retrieval and viewing. These visual profiles of course would be useful primarily from a human insterest standpoint. The collected data may be processed automatically and may be reformated to easily interface with any existing computer program for automatic car routing, scheduling or graphical processing. Furthermore, complete packages of clearance programs for automatic routing can readily be developed using known programming techniques although such programs do not constitute a part of this invention.

Thus whether the right-of-way being inspected is that of a railroad right-of-way, a tunnel, a road, a ship channel, a canal or other passage, this invention provides a rather unique method and system for economically and simply determining the necessary minimum clearance profiles requiring a minimal amount of stored information. This stored information developed, for example, covering the hundreds of thousands of miles of railroad tracks around the country would provide a simple method of readily and quickly routing even the most bulky and cumbersome loads.

It is obvious that many embodiments may be made of this inventive concept and that many modifications may be made in the embodiments hereinbefore described. Therefore, it is to be understood that all descriptive matter herein is to be interpreted merely as illustrative exemplary and not in a limited sense. It is intended that various modifications which might readily suggest themselves to those skilled in the art be covered as far as the prior art permits.

What is claimed is:

1. The method in an automatic system for obtaining information relative to the clearance profile of a lineal right-of-way from sequential ranging information developed by radially scanning at least a portion of said right-of-way with a range determining apparatus while lineally traversing the same, which method comprises:

generating physical representations of said ranging information, segmenting the physical representations derived from at least a portion of each radial scansion, storing the segmented physical representations from one of said radial scansions, comparing said segmented physical representations of said ranging information derived from subsequent radial scansions with corresponding ones of said stored representations for determining the lesser range physical representations, and updating said stored physical representations with the lesser one of each of said compared physical representations, whereby said stored representations correspond to the minimum clearance ranges of said right-of-way.

2. A method according to claim 1 including the additional step of transferring said updated representations to an auxiliary storage upon the completion of each right-of-way determination.

3. A method according to claim 1 including the additional steps of:

generating physical manifestations corresponding to the lineal distance along said right-of-way of each of said radial scansions, and storing the distance manifestations corresponding to any of said segmented range manifestations which upon said comparison is found to be less than a prior corresponding segmented range manifestation.

4. A method according to claim 3 including the additional step of updating said stored physical distance representations with the distance representation corresponding to the lesser of said range physical representations.

5. A method according to claim 4 including the additional step of transferring said updated distance representations to an auxiliary storage upon the completion of each right-of-way determination.

6. A method according to claim 5 which includes the steps of:

selecting those physical representations corresponding to range information falling between predetermined limits, and counting each such physical representation.

7. A method according to claim 1 which includes the additional steps of:

selecting those physical representations corresponding to range information falling between predetermined limits, and counting each such physical representation.

8. The method in a computing system for obtaining information relative to the clearance profile of a lineal right-of-way from sequential ranging information developed by radially scanning at least a portion of said right-of-way with a range determining apparatus while lineally traversing the same, which method comprises:

programming the computing system to store the ranging information derived from one of said radial scansions along said right-of-way, programming the computing system to successively compare selected angular portions of the ranging information obtained on each successive radial scansion with corresponding angular portions of the stored ranging information, programming the computing system to determine for each of said selected angular portions the lower ranging information, and programming said computing system to replace the originally stored ranging information after each determination of lower ranging information at each such angular portion.

9. A method according to claim 8 which includes the additional steps of:
receiving distance information corresponding to each successive radial scan,
programming said computing system to store said distance information corresponding to the lowest ranging information determination for each of said selected angular portions, thereby to reduce the information accumulated by said system.

10. An automatic system for determining the minimum clearance profile of a lineal right-of-way, said system utilizing ranging information representations developed by radially scanning said right-of-way with a range determining apparatus while linearly traversing such right-of-way, said ranging information comprising discrete elements of range information to the nearest obstruction for each of $n$ arcuate segments, said system comprising:
means for storing the ranging information representations for one of said radial scansions along said right-of-way,
means for successively comparing corresponding angular portions of said ranging information representations derived in scansions subsequent to said one with said one scansion ranging information,
means for determining for each said angular portion the lowest ranging information representation, and
means for storing such lowest ranging information for each said angular portion.

11. A system according to claim 10 which also includes:
means for deriving from said automatic system distance representations corresponding to the lineal position along said right-of-way of each of said radial scansions;
means responsive to said comparing means for storing said distance representations corresponding to the point of occurrence of lowest ranging information for each of said $n$ arcuate segments, thereby to reduce the information storage requirements of said system.

12. An automatic system for determining the minimum clearance profile of a lineal right-of-way, said system utilizing ranging information representations developed by radially scanning said right-of-way with a range determining apparatus while linearly traversing such right-of-way, said ranging information comprising discrete elements of range information to the nearest obstruction for each of $n$ arcuate segments, said system comprising:
means for generating physical representations of said ranging information,
means for segmenting into $n$ segments the physical representations derived from at least a portion of each radial scansion,
means for storing each of said $n$ segmented physical representations from one of said radial scansions,
means for comparing each of said $n$ segmented physical representations of said ranging information derived from each subsequent radial scansion with corresponding ones of said $n$ stored representations, and
means responsive to said comparing means for updating said stored representations with the lesser one of each of said representations, whereby said stored representations correspond to the minimum clearance of said right-of-way.

13. A system according to claim 12 which also includes:
means for generating physical manifestations corresponding to the lineal distance along said right-of-way of each of said radial scansions, and
means for storing the distance manifestations corresponding to any of said segmented range manifestations which upon said comparison is found to be less than a prior corresponding segmented range manifestation.

14. A system according to claim 13 which also includes:
means for updating said stored physical distance representations with the distance representations corresponding to the lesser of said range physical representations.

15. A system according to claim 14 which also includes:
means for selecting those physical representations corresponding to range information falling between predetermined limits, and
counting each such physical representation.

16. A system according to claim 12 which also includes:
means for selecting those physical representations corresponding to range information falling between predetermined limites, and
counting each such physical representation.

* * * * *